Dec. 24, 1963  H. S. ANTOLINI  3,115,261
COMBINATION ATTACHMENT FOR EARTH MOVING TRACTORS
Filed Dec. 23, 1960  3 Sheets-Sheet 1

INVENTOR.
HENRY S. ANTOLINI
BY
*H. W. Brelsford*
ATTORNEY

INVENTOR.
HENRY S. ANTOLINI

Dec. 24, 1963   H. S. ANTOLINI   3,115,261
COMBINATION ATTACHMENT FOR EARTH MOVING TRACTORS
Filed Dec. 23, 1960   3 Sheets-Sheet 3

INVENTOR.
HENRY S. ANTOLINI
BY
H. W. Brelsford
ATTORNEY

United States Patent Office 3,115,261
Patented Dec. 24, 1963

3,115,261
COMBINATION ATTACHMENT FOR EARTH MOVING TRACTORS
Henry S. Antolini, 113 E. Guiterrez, Santa Maria, Calif.
Filed Dec. 23, 1960, Ser. No. 77,980
6 Claims. (Cl. 214—620)

My invention relates to earth and rock moving equipment and has particular reference to combination attachment for tractors that will act as a fork lift, ripping spike, bulldozer and skip loader. My combination attachment can be used on any suitable linkages and mechanisms for lowering and tilting earth moving tools mounted on tractors.

In the past many different types of combination tools have been developed and commercially marketed whereby a tractor can be provided with a variety of different working tools. For example, interchangeable bulldozer blades and skip loaders have been designed for tractors so that these tools can be used alternately. However, these combination tools in the past have required considerable manual labor to attach them to the tractor or to the linkages connected to the tractor. Additionally, considerable manual effort has been required to exactly position these heavy tools with the result that several men were required to manually move the tools to the proper position for connection. Accordingly, it has been almost impossible for one man working alone in the field to interchange different tools on a tractor, while seated on the tractor.

I have devised a mechanism that is power operated whereby one man can attach different tools to an earth moving tractor. I provide a vertical frame from which forks project. I employ these forks to pick up the appropriate tool to be mounted to the tractor and I then employ power operated latches whereby these tools are mechanically secured to the frame with great mechanical strength. A tool is discarded hydraulically by unlatching it, dropping it to the ground, and pulling the forks out from under it. A tool is attached by moving the forks under it until it strikes the frame and then actuating the power operated latches to secure the tool to the frame.

It is therefore a general object of my invention to provide combination attachment for earth moving tractors which may be changed from one tool to another.

Another object of my invention is to provide a fork lift with power actuated latches so that different tools may be secured to the fork lift.

Another object of my invention is to provide a combination fork lift, ripper, bulldozer and skip loader wherein the various tools may be connected by power without manual effort.

Other objects and advantages of my invention will be apparent in the following description and claims considered together with the accompanying drawings in which:

Figure 1:
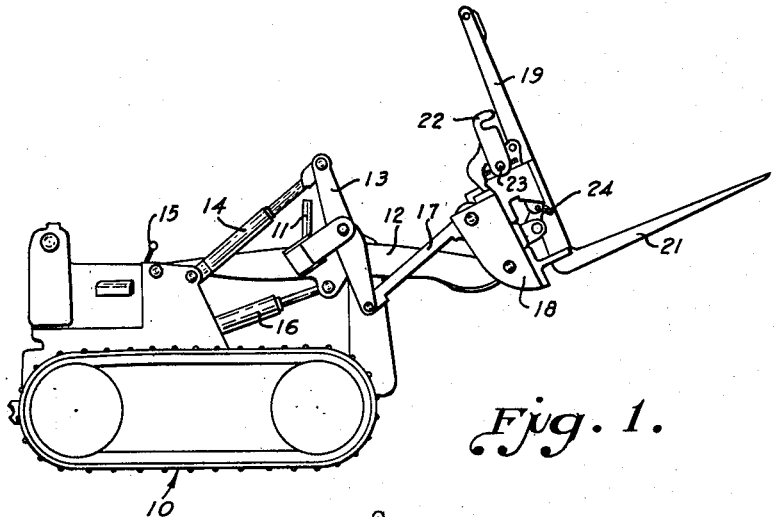
FIG. 1 is an elevation view of a tractor and attached cylinders and linkages wherein a fork lift embodying my invention is connected to the outer extremity of the linkages.

Referring to FIG. 1, a tractor at 10 may be of any suitable shape or construction and for illustrative purpose an endless track is shown but wheeled tractors can be used. The power cylinder of the invention may be operated by a control 15. An exhaust pipe is shown at 11 and suitable linkages at 12 and 13 may be connected to the tractor and operated by power cylinders 14 and 16. Any suitable linkages or other tool elevating mechanism may be employed whether operated by cylinder motors, cables, rack and gear or other mechanism. Pivoted to the bottom end of the cross lever 13 may be lever 17 for determining the attitude or angle of the earth moving tool.

The mechanism embodying the invention may include a pair of mounting plates 18, to which is secured a vertical frame member 19. Projecting at approximately right angles from the bottom end of the frame 19 is a fork 21 which may have as many tines as desired but two are illustrated.

Figure 2:
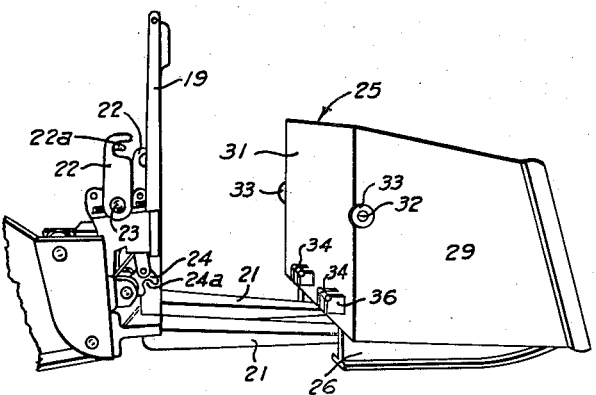
FIG. 2 is a perspective view, on an enlarged scale, of the fork lift of FIG. 1 inserted under a skip loader bucket preparatory to attachment.
Figure 3:
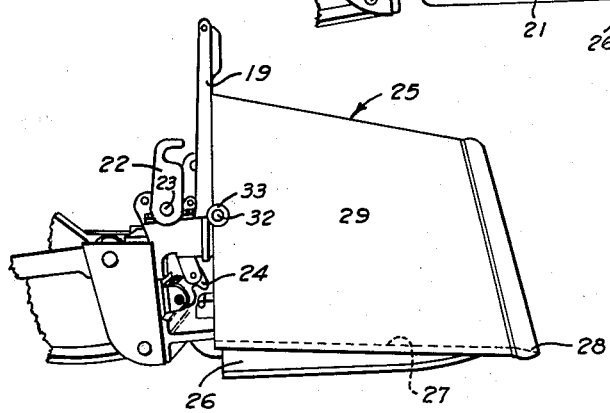
FIG. 3 is a perspective view of the fork lift and skip loader bucket of FIG. 2 in position for being securely latched to the fork lift.

Referring now generally to FIGURES 1, 2 and 3, there is provided particularly in accordance with my invention a plurality of latch mechanisms including an upper pair of latch bars 22 mounted for rotational movement on a shaft 23. A lower pair of latch bars 24 are mechanically interconnected to the shaft 23 and operated thereby and are disposed at a different vertical position on the frame 19 so that any tool secured to the frame will have two large connections that are vertically spaced.

A skip loading bucket provided particularly in accordance with the invention is illustrated in FIGURES 2 and 3 and is designated generally by the numeral 25 and may include a pair of spaced skids 26 between which the fork 21 may fit with a fairly close fit. The bottom 27 of the bucket is supported during operation by the forks 21 and may be inclined slightly toward the right so that a cutting edge 28 will be as low as the bottom of the skids 26. The skip loader bucket 25 may have the usual side panels 29 and a back panel 31.

The skip loading bucket 25 has a pluralitay of latch receivers provided particularly in accordance with the invention. These receivers may take the form of a pair of horizontally projecting rods 32 having a flange 33 on the outer end thereof. These rods 32 receive a notch 22a in the latch bar 22 and in this fashion the bucket 25 is latched to the frame 19. The latch receivers for the lower latch bars 24 may also be in the form of a pair of horizontal rods 34 spaced from the back 31 of the bucket by plates 36. These bars 34 fit in notches 24a of the latch bars 24, thus locking the bucket 25 at two vertically spaced points. The skids 26 act as guides or alignment recesses so that the bucket 25 will be accurately positioned on the frame permitting the latches to fit the latch receivers.

When it is desired to release the bucket 25, the fork lift is lowered to the ground at which time the bucket is supported by the skids 26. The upper latches 22 and the lower latches 24 are then operated by power to rotate in a counter-clockwise direction as viewed in FIGURES 2 and 3 until they reach the raised position shown in those figures at which time the bucket is free of the equipment. The tractor may then be backed away from the bucket 25 and it will remain on the ground. The equipment is then free to be used as a fork lift or the fork 21 may be inclined toward the ground to be used as a digging or ripper spike to uproot rocks and hard earth, etc.

Figure 4:
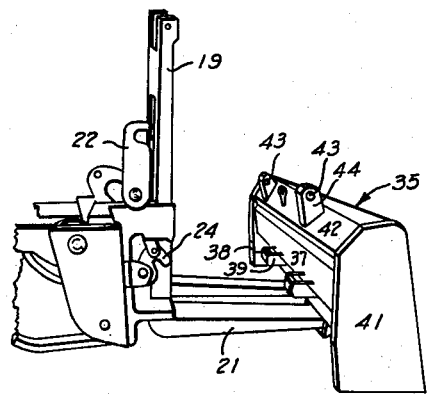
FIG. 4 is a perspective view of the fork lift of my invention inserted under a bulldozer blade.
Figure 5:
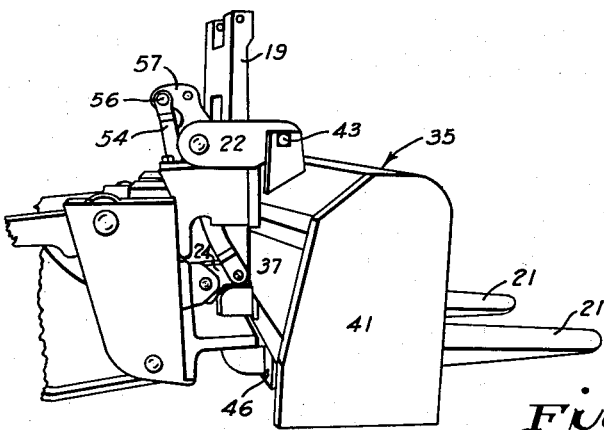
FIG. 5 is a perspective view of the bulldozer blade of FIG. 4 securely clamped to the fork lift frame.

When it is desired to use the equipment as a bulldozer, the forks 21 are moved underneath a bulldozer blade shown in FIGS. 4 and 5 and designated generally by the numeral 35. The bulldozer blade 35 may have a generally vertical panel 37 to which are mounted horizontal latch receiving bars 38 spaced from this panel by mounting plates 39. If desired, the bulldozer blade 35 may have end plates 41 with a horizontal bottom edge. This horizontal bottom edge on plates 41 may be used to keep the bulldozer blade upright if other support means are not used for this purpose. It may have a top frame member 42 to which are secured horizontal latch bars 43 which may be spaced therefrom by mounting plates 44. The bulldozer blade 35 may have spaced skids or elongated slot structure 46 and the fork tines may fit closely in these slot structures so that the bulldozer blade will be accurately guided and positioned against the frame 19 so that the latch bars 22 and 24 will be in position to latch on the horizontal receivers 43 and 38 respectively. When the back panel 37 is tight against the vertical frame 19, the latches 22 and 24 are rotated by power to engage the latch receivers and thereby lock the bulldozer blade 35 to the frame 19.

Figure 6:
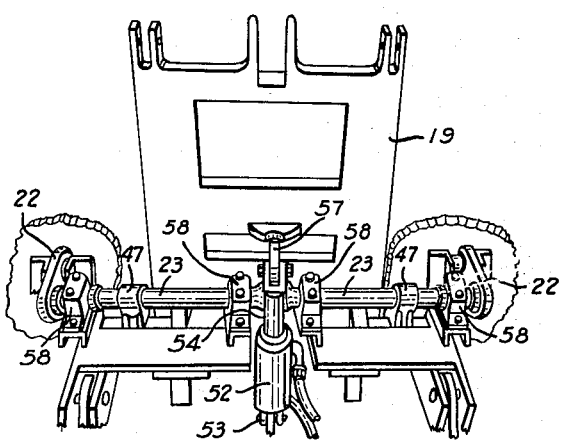
FIG. 6 is a perspective view from the tractor side of the fork lift showing the power cylinder and mounts for the upper latches of my mechanism.
Figure 7:
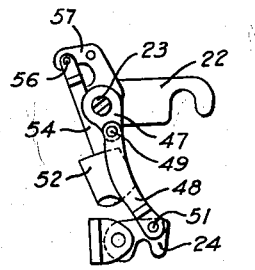
FIG. 7 is an elevation view of the power cylinder and operating cranks of FIG. 6, with parts broken away.

The interconnection of the upper latches 22 with the lower latches 24 is illustrated in FIGURES 5, 6 and 7. In FIG. 7 the shaft 23 has been broken away together with the nearest of the latches 22. There it will be noted that a short crank arm 47 is connected to the shaft 23. A link 48 connects the outer end of this crank arm 47 to the lower latch 24. Thus rotation of the shaft 23 causes the latching of the upper latch bars 22 and the lower latch bars 24.

This crank arm 47 and link 48 are constructed particularly in accordance with the invention in that there is provided an over-center locking action. The crank arm 47 is hinged to the link 48 by a pin 49. The lower end of the link 48 is hinged to the latch bar 24 by a pin 51. The center of the pin 49 is to the left (in FIG. 7) of a straight line drawn from the center of the shaft at 23 to the center of the pin 51. Thus, the violent jolts and blows delivered to either the bulldozer blade 35 or the skip loader bucket 29 will not permit the latch 24 to move upwardly inasmuch as this over-the-center connection causes the shaft 23 to rotate in a clockwise direction.

The mechanism presently preferred for rotating the shaft 23 is a hydraulic cylinder motor 52 which may be pivoted to the frame 19 at 53 (FIG. 6). The cylinder 52 is double acting and a piston rod 54 is pin jointed at 56 to a crank arm 57 welded or otherwise secured to the shaft 23. The shaft 23 may be suitably journaled in a plurality of bearings 58. The crank arms 47 and 57 are preferably keyed and locked to the shaft 23.

In operating the device of FIG. 1, the tractor operator may raise or lower the entire mechanism by proper manipulation of the cylinder 16. He may select the angle of the forks 21 by operation of the cylinder 14. When it is desired to use the device of FIG. 1 as a fork or fork lift, or as a ripping spike, the latches 22 and 24 are in a withdrawn position as illustrated in FIG. 1. The latches 22 and 24 come into play when it is desired to latch on either the skip loading bucket 29 of FIG. 3 or the bulldozer blade 35 of FIG. 4. The tractor operator then operates the control 15 to admit hydraulic fluid under pressure to the cylinder 52 causing the shaft 23 to rotate in a clockwise direction. This shaft rotation causes the latch bars 22 to connect with their latch receiving bars 43 and also causes the crank arm 47 to rotate to the position shown in FIG. 7. This crank arm operates through the links 48 to rotate the latch bars 24 in a clockwise direction to engage the different receiving bars on either the skip loader bucket 29 or the bulldozer blade 35. The fact that the hinge 49 of FIG. 7 is to the left of a straight line between the shaft 23 and the pivot pin 51 gives an over-the-center action which securely locks the latch bars 24 and the latch bars 22 against any blows delivered against the different tools. Thus, the slight leakage generally encountered in a hydraulic cylinder over a period of time will not permit the latches to come close.

It will be noted that only the tractor operator alone is required to connect or disconnect either the bucket 25 or bulldozer blade 35. The runners 26 on the bottom of the bucket 25 accurately align the bucket on the fork 21 so that it is in exact position to receive the latch bars 22 and 24. Similar skids 46 on the bottom of the bulldozer blade 35 define similar guides or aligning notches for the bulldozer blade 35. By jamming the tractor snugly against either the bucket 25 or the bulldozer blade 35, these tools are in a position against the vertical frame 19 to receive the latch bars. Thus, it is not necessary for the operator to get off of the tractor and manhandle the blade or the bucket. Release of these tools is similarly easily performed.

It should be noted that when the latch bars 22 and 24 rotate in a clockwise direction as viewed in the drawings, the limit of clockwise movement is the physical contact between the latch bars and the respective latch receivers. This in turn determines the amount of movement past dead center of the hinge pin 49 and determines the amount of locking over-the-center movement.

I have found that locking the tools to the frame 19 at two different vertical levels results in secure locking to the appliance. If only one locking level is used, there is a tendency for the bucket or blade to slide forward on the forks.

The fact that the forks 21 project forward of the bulldozer blade 35 does not interfere with the operation of the bulldozer. In fact, in stony ground it is a positive help, rooting out hard rock that would give the blade trouble. By angling the forks downward large rocks can be removed and the ground ripped and loosened, while at the same time the blade smoothes the ground.

Figure 8:
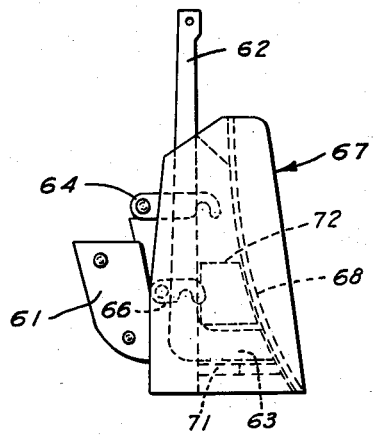
FIG. 8 is a side view of a modified form of the invention wherein short forks are used for heavy duty ripping, and a modified form bulldozer blade is secured thereto wherein the forks do not project forward of the blade.
Figure 9:
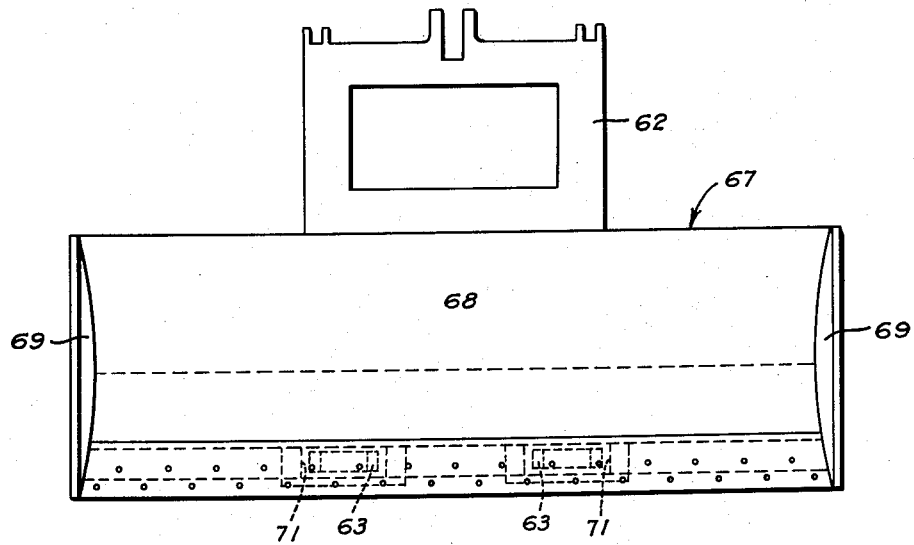
FIG. 9 is a front view of the bulldozer blade of FIG. 8.

Illustrated in FIGS. 8 and 9 is a modification of the attachment wherein short fork tines are employed for heavy ripping or rock removal. Side plates 61 may be connected to the tractor levers 12 and 13 of FIG. 1 in the usual fashion, or to any other type of attachment support. A vertical frame 62 may be connected to the plates 61 in any suitable fashion, and short, stout forks 63 may project horizontally forwardly from the vertical frame 62. Suitable upper latches 64 and lower latches 66 may be provided as previously described.

Also shown in FIGS. 8 and 9 is a bulldozer blade 67 secured by the latches 64 and 66 to the vertical frame 62 and the horizontal forks 63. The blade may have a curved front surface or panel 68 and end plates 69 which are preferably horizontal on their bottom edges to hold the entire blade 67 upright when it is not secured to the frame 62 and forks 63. Heavy steel pockets 71 are formed near the bottom of the blade 67 to receive the forks 63. Preferably these forks are tapered in plan view to be narrow at their tips and wider at their bases where they attach to the vertical frame 62. The pockets may be correspondingly tapered, and in this fashion the blade may be easily guided to the proper location against the vertical frame 62 so that the latch receivers (not shown) on the blade may be in a proper position to be engaged by the latches 64 and 66. If desired, a pillow block 72 may be attached to the rear of the front surface 68 to bear against the frame 62 and support that surface 68. If desired, the bottom part of the pockets 71 may have a hole therein to let dirt drop out.

A skip loading bucket can similarly be attached to the short forks 63 and vertical frame 62. When used with a bulldozer blade, however, the short forks have the characteristic of not projecting through the blade, giving a smooth blade operation. The bulldozer blade 67 may be detached in the fashion described for FIGS. 4 and 5 and the short forks 63 are then available for heavy duty ripping or rock carrying.

Various other tools may be mounted on my frame and fork. I have utilized an upper finger mounted on the upper end of the frame 19 so that this finger could come down upon large rocks or other objects and hold them securely upon the forks 21. For this purpose a link connection is made to the crank arm 57 to which the piston rod 54 is connected. Various other tools will occur to those skilled in the art. While I have described my invention with respect to presently preferred embodiments thereof, I do not limit myself to these embodiments, but claim all modifications and variations that fall within the true spirit and scope of my invention.

I claim:

1. For earth moving tractors a multi-purpose appliance for holding earth moving tools that have latch receivers at two vertically spaced positions comprising: a generally vertical frame; a horizontal shaft mounted for rotation on said frame; latch bars secured to said shaft and rotatable from a position within said frame to a position in front of said frame; a plurality of crank arms secured to said shaft; a piston-cylinder motor connected to one of said crank arms for rotating said shaft; a latch bar pivoted to said frame at a different vertical level than said shaft and rotatable from a position within said frame to a position in front of said frame; and a link connecting another of said crank arms to said latch bar, said latch bars being adapted to engage the latch receivers of said earth moving tools to secure it to the appliance.

2. In combination with an earth moving tool having latch receivers attached to the body thereof at two vertically spaced positions, a multi-purpose appliance for tractors comprising: a generally vertical frame; generally horizontal forks projecting from the lower end of said frame; a plurality of latch bars movably mounted on said frame at at least two different vertical levels; and power means for operating the latch bars, at least two of said latch bars engaging the latch receivers of the tool to lock the tool securely to the appliance; said tool comprising a generally vertical elongated horizontally extending bulldozer blade, horizontal guide means formed on the bottom of said blade to receive the forks; and said vertically spaced latch receivers mounted on said blade to be engaged by said bars permitting said bulldozer blade to be mechanically locked to the frame by the latches and to be supported by the forks.

3. In combination with an earth moving tool having latch receivers attached to the body thereof at two vertically spaced positions, a multi-purpose appliance for tractors comprising: a generally vertical frame; generally horizontal forks projecting from the lower end of said frame; a plurality of latch bars movably mounted on said frame at at least two different vertical levels; and power means for operating the latch bars, at least two of said latch bars engaging the latch receivers of the tool to lock the tool securely to the appliance; said tool comprising a skip loader bucket comprising a generally horizontal bottom, a generally vertical back, guide means formed on the bottom for receiving the forks, and said latch receivers vertically spaced on said back, whereby said bucket may be mechanically locked to the frame by said latch bars, said guide means disposing said latch receivers at positions to be engaged by the latch bars.

4. In combination with an earth moving tool having latch receivers attached to the body thereof at two vertically spaced positions, a multi-purpose appliance for tractors comprising: a generally vertical frame; generally horizontal forks projecting from the lower end of said frame; a plurality of latch bars movably mounted on said frame at at least two different vertical levels; and power means for operating the latch bars, at least two of said latch bars engaging the latch receivers of the tool to lock the tool securely to the appliance, some of said latch bars being pivoted to the frame, a rotatable shaft journaled on the frame, cranks connected to said rotatable shaft, links connected between said cranks and said latch bars to rotate said latch bars, and means for stopping the crank and links in a position past dead center to create an over-the-center lock when the latch bars are rotated into engaging position.

5. In combination with an earth moving tool having latch receivers attached to the body thereof at two vertically spaced positions, a multi-purpose appliance for tractors comprising: a generally vertical frame; generally horizontal forks projecting from the lower end of said frame; a plurality of latch bars movably mounted on said frame at at least two different vertical levels; and power means for operating the latch bars; said tool including a generally vertical back member; guide means on the bottom of said back member receiving the forks; and said vertically spaced latch receivers disposed on said back member engaging said latch bars whereby the tool is securely locked to the frame.

6. In combination with an earth moving tool having latch receivers attached to the body thereof at two vertically spaced positions, a multi-purpose appliance for tractors comprising: a generally vertical frame; generally horizontal forks projecting from the lower end of said frame; a plurality of latch bars movably mounted on said frame at at least two different vertical levels; and power means for operating the latch bars, said tool comprising a skip loader bucket, latch receivers on said skip loader bucket engaged by at least two of said latch bars to lock the tool securely to the appliance.

References Cited in the file of this patent

UNITED STATES PATENTS

| | | |
|---|---|---|
| 2,482,692 | Quales et al. | Sept. 20, 1949 |
| 2,515,384 | Von Carnop | July 18, 1950 |
| 2,665,021 | Wight | Jan. 5, 1954 |
| 2,686,324 | Costarella | Aug. 17, 1954 |
| 2,958,434 | Wagner | Nov. 1, 1960 |
| 2,978,126 | Chambers | Apr. 4, 1961 |
| 2,979,137 | Hess | Apr. 11, 1961 |
| 3,015,402 | Norton et al. | Jan. 2, 1962 |

FOREIGN PATENTS

| | | |
|---|---|---|
| 764,983 | England | Jan. 2, 1957 |